United States Patent
Schüren

(10) Patent No.: US 6,756,712 B1
(45) Date of Patent: Jun. 29, 2004

(54) THREE PHASE CONVERTER FED MOTOR HAVING A SHIELDING DEVICE TO ELIMINATE CAPACITIVE CURRENT IN STATOR SLOTS

(75) Inventor: Volker Schüren, Marktheidenfeld (DE)

(73) Assignee: Atecs Mannesmann AG, Düsseldorf (DE)

( * ) Notice: Subject to any disclaimer, the term of this patent is extended or adjusted under 35 U.S.C. 154(b) by 0 days.

(21) Appl. No.: 09/672,862

(22) Filed: Sep. 28, 2000

(30) Foreign Application Priority Data

Sep. 28, 1999 (DE) .......................... 199 48 145

(51) Int. Cl.[7] .............................. H02K 3/32; H02K 3/34
(52) U.S. Cl. ........................... 310/71; 310/215; 310/89
(58) Field of Search ..................... 310/215, 71, 216, 310/43, 90, 89

(56) References Cited

U.S. PATENT DOCUMENTS 5,861,689 A * 1/1999 Snider et al. ................. 310/71

6,202,285 B1 * 3/2001 Bell .............................. 29/596

FOREIGN PATENT DOCUMENTS

JP          10-257707 A   *  9/1998   .................. 310/215

OTHER PUBLICATIONS

PTO Translation of Shioda et al., JP 10–257,707; Sep. 1998.*

* cited by examiner

*Primary Examiner*—Karl Tamai
(74) *Attorney, Agent, or Firm*—Cohen, Pontani, Lieberman & Pavane

(57) ABSTRACT

A device for preventing bearing damage from currents through a three-phase motor is provided, including a shield for winding and copper wire within each stator slot of a motor. The shield includes an electrically conductive layer which is insulated from the winding and from the laminated stator core of the three-phase motor. The conductive layer is grounded or conductively connected to the laminated stator core of the three-phase motor on only that side on which the three-phase current is fed to the winding of the motor.

5 Claims, 3 Drawing Sheets

THREE PHASE CONVERTER FED MOTOR HAVING A SHIELDING DEVICE TO ELIMINATE CAPACITIVE CURRENT IN STATOR SLOTS

BACKGROUND OF THE INVENTION

1. Field of the Invention

The present invention relates to a three-phase motor which can be fed from a converter. More particularly, the present invention includes a shielding device that eliminates capacitive current in the stator slots so as to prevent a current circuit in the laminated core of the motor and avoid inducing voltage in the motor shaft.

2. Description of the Related Art

Bearing damage is on the rise in modern converter-fed three-phase motors due to the high switching speed of IGBT converters. This bearing damage is caused by high-frequency bearing currents flowing through the shaft, bearing and laminated stator core. The bearing currents are induced because a high voltage gradient of the feed voltage with respect to ground induces a voltage in the motor shaft, which results in bearing currents through the bearings and the housing. As remedial measures to prevent these bearing currents, the person skilled in the art is familiar with insulated bearings composed of ceramic balls or with an insulating oxide layer on the outer ring of the bearing. These insulated bearings are relatively expensive. The person skilled in the art is also aware that it is possible to use inductors or filters to reduce the voltage gradient du/dt at the converter output. However, with this design standardization is difficult since it is necessary to define the type and cable length of the motor.

SUMMARY OF THE INVENTION

The object of the present invention is to efficiently prevent bearing damage in three-phase motors in an easy and economical manner.

The present invention solves the aforementioned problem without major reliance on parameters of the motor. As a result, the current carrying properties of the converter or cables thus have no influence on the bearing currents. Standardization becomes readily possible and efficient, irrespective of the cable length, motor type or the like. According to the present invention, the capacitive outgoing current, which, according to the prior art, flows out of the winding of the three-phase motor in the laminated stator core of the three-phase motor, is carried away by a conductive shield in each stator slot between the winding and the stator to the ground connection. In this case, this shield is connected to the housing (i.e., to PE or ground) on only that side of the stator on which the three-phase current is fed into the winding of the three-phase motor. This connection may be configured in such a way that the shield is connected via a shield connection from the terminal box to the housing (PE) for grounding. Alternatively, the shield can be connected to the laminated core on the side of the stator on which the three-phase current is fed in. This connection of the shield to the laminated core can be achieved particularly efficiently by removing the insulation between the shield and the laminated core on this side, so that the shield makes direct conductive contact with the laminated core on this side.

According to the present invention, prevention of bearing current operates so that the capacitive outgoing current, whose magnitude is not changed by the invention, does not flow in the laminated stator core. Rather, the capacitive outgoing current flows in the shield, and is fed back through the slot to the feed point. As a result, the capacitive current in the slots is cancelled, there is no longer any circular flow in the laminated stator core and thus no voltage is induced in the motor shaft, which is responsible for the bearing current that damages the bearings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become apparent from the following description of an exemplary embodiment with reference to the accompanying drawings, in schematic form as follows.

DETAILED DESCRIPTION OF THE PRESENTLY PREFERRED EMBODIMENTS

Figure 1:
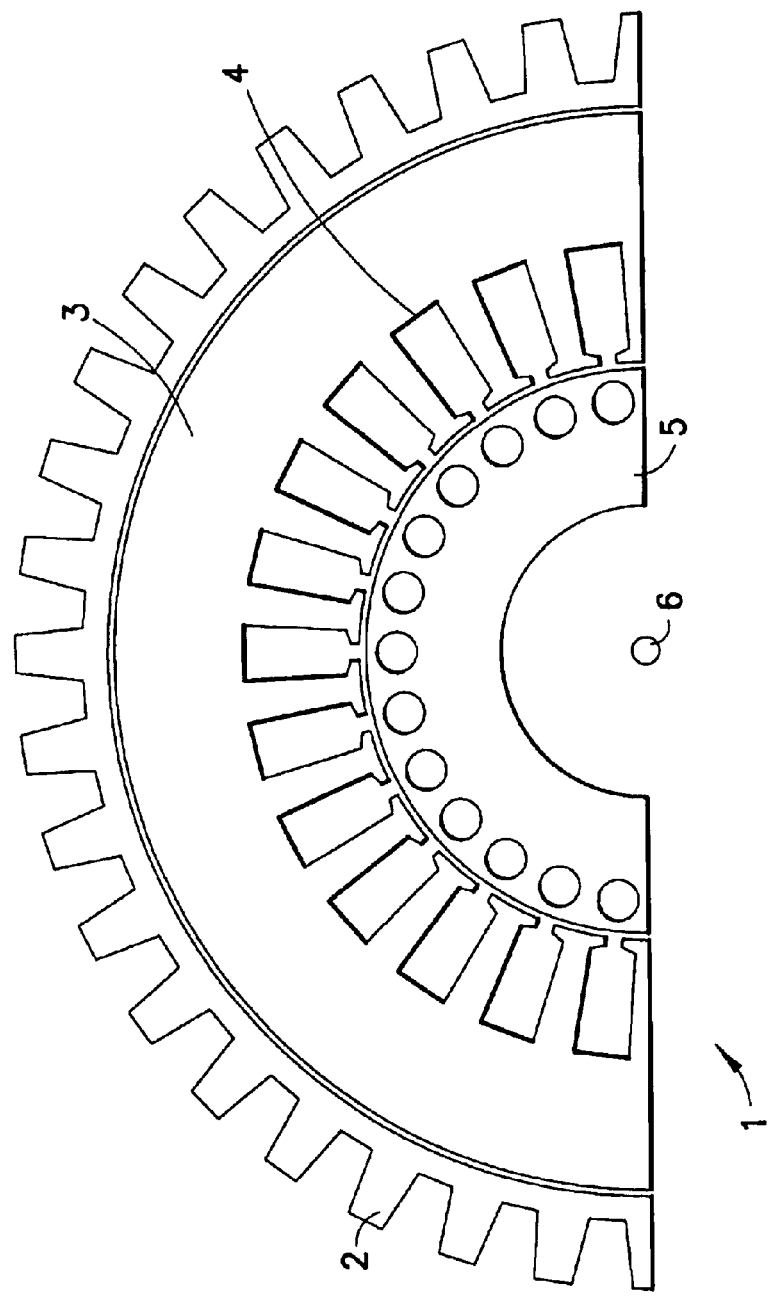
FIG. 1 is a cross-sectional view through a three-phase motor.

FIG. 1 shows, schematically, a section through a three-phase motor 1 having a housing with cooling ribs 2, a stator laminate 3 with (as a rule 36) stator slots 4, a rotor laminate 5 and a shaft 6 to be driven.

Figure 2:
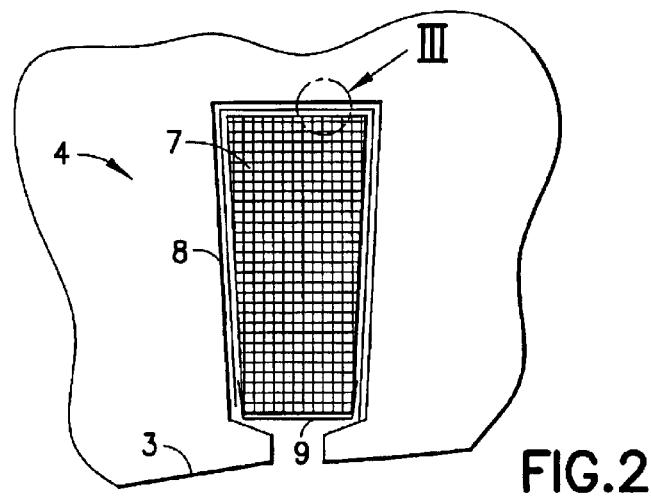
FIG. 2 shows a cross section through one of the stator slots.
Figure 3:
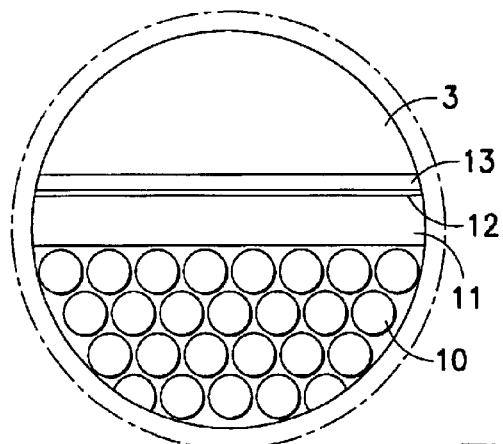
FIG. 3 is an enlargement of a detail to illustrate the shield in FIG. 2.

FIG. 2 shows copper windings 7, slot insulation 8, a stator laminate 3 and a slot cover 9 for a stator slot 4. FIG. 3 shows an enlargement of the detail shown in the circle in FIG. 2, with copper wires 10 of the winding 7, conventional slot insulation 11 and a shield 12 according to the present invention between the windings 7 of copper wires 10 and the stator laminate 3. Conventional slot insulation 11 is provided between the electrically conductive shield 12 and the winding 7 of copper wires 10. Further insulation by means of the insulating layer 13 is provided between the shield 12 and the stator laminate 3. The shield 12 is thus located between the winding 7 of copper wires 10 and the stator laminate, but is insulated from both.

Figure 4:
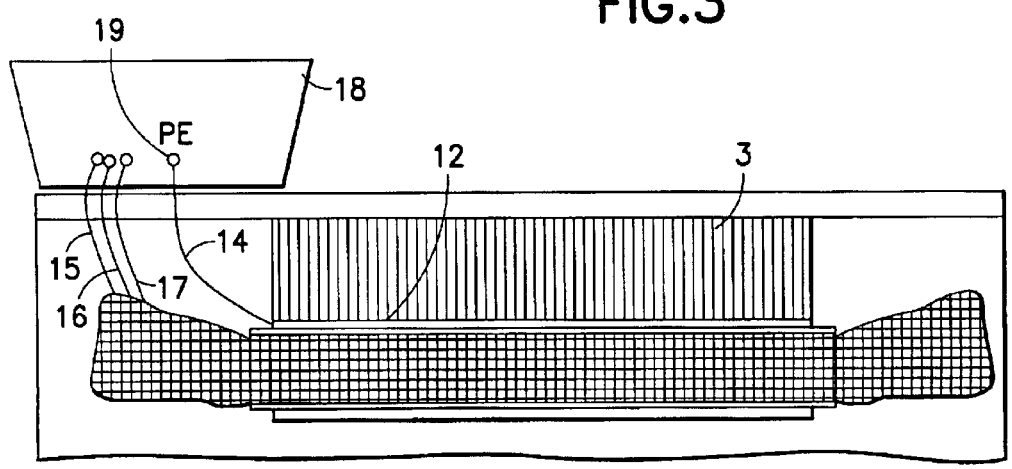
FIG. 4 is a partial longitudinal sectional view of the motor.

As FIG. 4 shows in a partial longitudinal section, the shield 12 of one slot is in each case connected via a shield connection 14 to PE (ground) on the terminal box of the three-phase motor. The shield connection 14 is connected on the side (on the left in FIG. 4) of the shield 12 on which connecting lines 15, 16, 17 of the winding 7 of the motor are also connected. In this way, any circular flow and consequently any induction of motor shaft currents and thus bearing currents are prevented.

Figure 5:
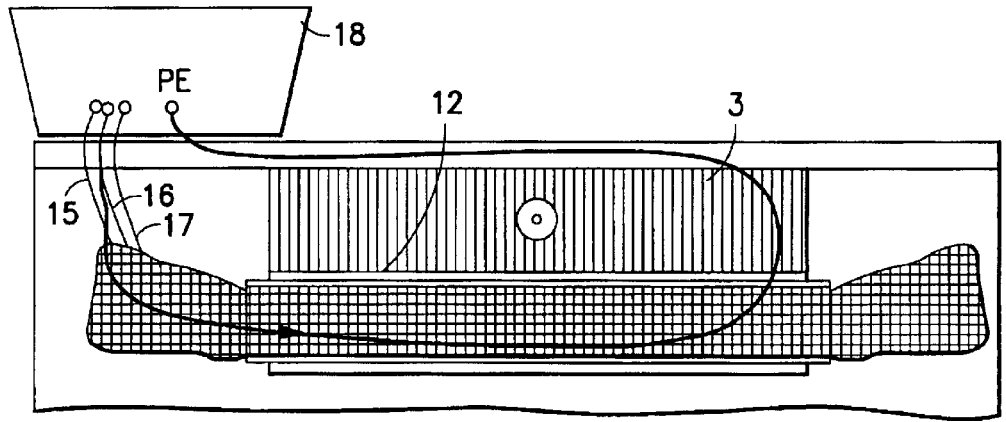
FIG. 5 shows a path of the circular flow induced in the laminated core of a motor as shown in FIG. 4 according to the prior art.

An arrow in FIG. 5 indicates the induction of a circular flow as occurs in the prior art. Since a capacitive outgoing current flows out of the winding into the laminated stator core in the prior art, a circular flow occurs in the laminated stator core, which results in a voltage in the shaft and thus currents through the bearings.

Figure 6:
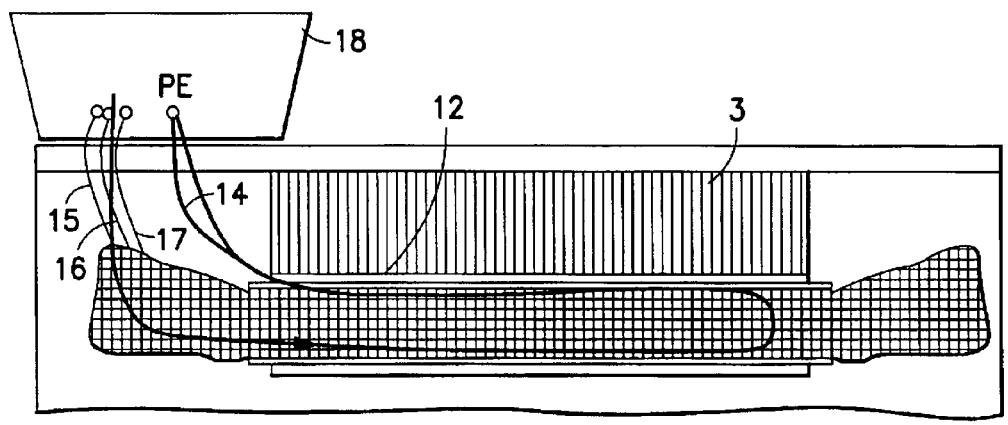
FIG. 6 shows how the invention cancels out the circular flow in a motor as shown in FIG. 4, by means of a shield according to the present invention.

As FIG. 6 shows, according to the present invention, the shield between the motor winding 7 and the laminated stator core 3 results in a capacitive outgoing current no longer flowing out via the laminated stator core but (see the arrow) via the shield, and the current in this case being fed back within the slot to the three-phase current feed point (left-hand side in FIG. 6), so that the capacitive current in the slots is cancelled out. There is thus no longer any circular flow in the laminated stator core and thus no voltage in the motor shaft either, as a result of which damaging bearing currents are avoided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A three phase converter fed motor, comprising:

a shall mounted in bearings;

a stator having a laminated core, a winding and a plurality of slots, the winding having a current fed side, the stator being operatively connectable to a three phase-current via the winding;

a shield comprising an electrically conductive layer, the shield being operatively arranged between the current fed side of the winding and the laminated core so as to shield each slot, the shield being conductively connected to one of a ground and the laminated core in a predetermined manner so as to reduce amplitudes of capacitive currents circulating in the stator and bearings and thereby prevent damage to the bearings, said predetermined manner comprising said conductive connection of the shield being only on the current fed side of the winding;

first insulating means operatively arranged between the shield and the winding for insulating the shield from the winding; and second insulating means operatively arranged between the shield and the laminated core for insulating the shield from the laminated core.

2. The motor according to claim 1, further comprising:

a ground connection, wherein the electrically conductive layer is connected to the ground connection.

3. The motor according to claim 1, wherein the electrically conductive layer is connected to the laminated core.

4. The motor according to claim 3, wherein the second insulating means is at least partially absent on the current side of the laminated core so as to allow conductive contact between the conductive layer and the laminated core.

5. In a three-phase converter fed motor having a shaft mounted in bearings, a stator comprising a laminated core, a plurality of slots and a winding into which a three-phase motor-operating current is fed from one side of the winding, the improvement comprising an electrostatic shielding arrangement in the motor for reducing damage to the bearings from capacitively coupled induced high frequency bearing currents by minimizing the bearing currents, said improvement comprising:

an electrically conductive layer operatively disposed between the current fed side of the winding and the laminated stator core;

a first insulating layer disposed between the conductive layer and the winding for electrically insulating the conductive layer from the winding; and a second insulating layer disposed between the conductive layer and the laminated core for electrically insulating the conductive layer from the laminated core;

said conductive layer being connected to ground by an electrical connection extending between the conductive layer and one of a ground and the laminated core, said electrical connection being connected to the conductive layer only on the current fed side of the winding so as to minimize the bearing currents and thereby reduce damage to the bearings from said bearing currents.

* * * * *